United States Patent [19]
Ortiz et al.

[11] Patent Number: 5,869,415
[45] Date of Patent: Feb. 9, 1999

[54] PROCESS FOR ACTIVATING LAYERED SILICATES

[75] Inventors: Jose Antonio Ortiz; Carlos Martinez Reyes; Walter Reinking Cejudo, all of Puebla, Mexico; Werner Zschau, Steinebach, Germany; Christain Fabry, Munich, Germany; Hermann Ebert, Landshut, Germany

[73] Assignee: Sud-Chemie AG, Germany

[21] Appl. No.: 661,972

[22] Filed: Jun. 12, 1996

[30] Foreign Application Priority Data

Jun. 12, 1995 [DE] Germany .................. 195 21 345.9

[51] Int. Cl.⁶ ..................................... B01J 21/16
[52] U.S. Cl. ................... 502/81; 502/80; 502/83
[58] Field of Search ................... 502/80, 81, 83

[56] References Cited

U.S. PATENT DOCUMENTS

| | | |
|---|---|---|
| 1,492,184 | 4/1924 | Weir et al. . |
| 1,980,569 | 11/1934 | Belden et al. . |
| 2,563,977 | 8/1951 | Van Horn et al. . |
| 2,574,895 | 11/1951 | Stecker et al. ............ 502/81 |
| 3,029,783 | 4/1962 | Sawyer et al. . |
| 3,673,228 | 6/1972 | Harris et al. . |
| 4,443,379 | 4/1984 | Taylor et al. . |
| 4,487,226 | 12/1984 | Chun . |
| 4,692,425 | 9/1987 | Schneider et al. . |
| 4,701,438 | 10/1987 | Taylor et al. . |
| 4,717,699 | 1/1988 | Mickelson . |
| 4,735,815 | 4/1988 | Taylor et al. . |
| 4,919,818 | 4/1990 | Alexander . |
| 5,008,227 | 4/1991 | Taylor et al. . |
| 5,358,915 | 10/1994 | Nebergall et al. . |
| 5,468,201 | 11/1995 | Nebergall et al. . |
| 5,486,499 | 1/1996 | Davies et al. ............ 502/81 |

FOREIGN PATENT DOCUMENTS 1299797 12/1992 European Pat. Off. .

*Primary Examiner*—Michael L. Lewis
*Assistant Examiner*—Thomas G. Dunn, Jr.
*Attorney, Agent, or Firm*—Scott R. Cox

[57] ABSTRACT

A process is described for activation of layered silicates having an ion exchange capacity (IEC) of at least 25 meq/g by treating them with an acid, characterized in that the layered silicate is activated with about 1 to 10% by weight (based on the dry layered silicate) of an acid at a temperature of not more than 80° C. and the activated layered silicate is calcined at temperatures of about 200° to 400° C. and comminuted desired.

15 Claims, No Drawings

PROCESS FOR ACTIVATING LAYERED SILICATES

DESCRIPTION

Prior Art

The invention concerns a process for activating layered silicates.

A process for producing acid-activated decolorizing earth using a naturally occurring acidic attapulgite clay with a pH in the range of 5 to 7 and a pore volume in the range of 0.25 to 0.50 cm$^3$/g is known from U.S. Pat. No. 5,008,227. This clay is activated with an acidic solution equivalent to 10 weight % to 30 weight % acid at a temperature of 25° to 100° C. (77° to 220° F.). The acid-activated clay is not washed, but is used directly as a decolorizing earth. Aside from attapulgite, bentonite can also be activated with acid, but higher concentrations of acid are recommended than for attapulgite. The products obtained are also said to have poorer characteristics than acid-activated attapulgite. There is no further treatment of the acid-activated material. Because of the relatively large amount of acid used in activation, release of acid by the decolorizing earth to the material being decolorized cannot always be avoided.

A process for acid treatment of an attapulgite clay to produce an improved cat litter is known from U.S. Pat. No. 3,029,783. Relatively low amounts of acid are used in this process, and the acid-treated material is not washed. It is calcined at 370° to 540° C. (700° to 1000° F.) before the acid treatment, with another calcination at about 400° to 590° C. (750° to 1100° F.) after the acid treatment. These treatments are reported to increase the ability of the attapulgite to absorb urine and other body fluids. Use as a decolorizing earth is not discussed.

U.S. Pat. No. 1,492,184 describes activation of crude clay with not more than 10% by weight of concentrated acid. It is preferable to impregnate a previously dried and ground crude clay. Calcining is expressly to be avoided to prevent evaporation of the acid.

A process for treating clay is known from U.S. Pat. No. 4,487,226. In this process the clay is extruded and ground, and added to an aqueous acidic solution to produce a suspension. The suspension is heated, and the acid-treated clay is separated, washed, filtered off and dried. The intent of the treatment is reportedly to cause the clay to filter impurities from liquids better. In particular, oil-soluble dyes are said to be removed from oils. There is no heat treatment of the acid-activated clay.

Accordingly, the object of the invention is a process for activating certain layered silicates by acid treatment, which keeps the quantity of acidic wastewater as low as possible for environmental protection, and produces a product with high activity for removal of impurities from fats, oils and waxes.

BRIEF DESCRIPTION OF THE INVENTION

The subject of the invention is a process for activating layered silicates with an ion exchange capacity (IEC) of at least 25 meq/100 g comprising treating them with an acid, wherein the laminar silicate is activated with about 1–10% by weight of an acid (based on the weight of the layered absolutely dry silicate) at a temperature of not more than 80° C., and calcining the activated layered silicate at temperatures of about 200°–400° C. and comminuted if desired.

DETAILED DESCRIPTION OF THE INVENTION

As the amount of acid is kept below 10% by weight, the acid is at the most in a very slight excess, so that it is not necessary to separate excess acid or the salts formed during activation (alkali, alkaline earth, aluminum and iron salts). The subsequent calcination is also important. In this process, the salts probably migrate into the micropores of the acid-activated layered silicate and are deposited there. The micropores are not necessary to adsorb impurities from fats and oils, because the corresponding molecules (e. g., coloring materials, such as chlorophyll) are adsorbed only in the mesopores (pore diameter 2 to 25 nm) and in the macropores (pore diameter >25 nm). The salts are fixed in the micropores (<2 nm) during calcination.

Because of this 'self-cleaning effect' the activated layered silicates obtained no longer need to be washed, especially if the micropore volumes are relatively high and the proportion of salts is not excessive.

Calcination of the acid-activated layered silicate also allows use of the process according to the invention for a wider range of layered sheet silicates. Thus, for instance, materials having pH values higher than 7 in aqueous suspension are also utilizable in the process of the invention. Sometimes, to be sure, use of more acid is necessary; but because of the calcination, higher decolorizing activities are obtained even with these materials.

Depending on the calcination temperature, the calcination is carried out preferably over a period of from about 4 hours to 15 minutes, the duration of calcination being higher the lower the temperature is, and vice versa.

It is desirable to moisten the calcined product before grinding in order to get a better particle size distribution with a lower proportion of fines (<25 μm).

It is preferable to use a sheet silicate from the serpentine-kaolin group, the talc-pyrophyllite group, the smectite group, the vermiculite or illite group, and/or the micaceous sheet silicates.

The sheet silicates of the serpentine-kaolin group include, for example, chrysotile, antigorite, kaolinite and halloysite. The talc-pyrophyllite group includes talc and pyrophyllite. The smectite group includes the trioctahedral smectites, such as saponite and hectorite and the dioctahedral smectites such as montmorillonite, beidellite and nontronite. The chlorite group includes the trioctahedral and dioctahedral chlorites. The sepiolith-palygorskite group includes sepiolith and palygorskite.

The preferred starting material is a layered silicate which has a pH of more than 7 in a 9.1 weight % aqueous suspension, preferably from about 7.2 to 9.0. In general, a higher pH indicates a relatively high alkali content, requiring more acid for activation.

The activating acid is preferably added to a suspension of the layered silicate or kneaded into the layered silicate.

That procedure gives a homogeneous mixture of the activating acid with the layered silicate. If the activating acid is added to a suspension of the layered silicate, the water must be evaporated after the subsequent acid activation, increasing the energy consumption of the process. On the other hand, energy is also consumed when the acid is kneaded into the dry silicate, to produce a homogeneous distribution of the acid in the silicate. In order to achieve good mixing of the activating acid with the silicate and also to minimize the energy consumption for evaporating water, it is desirable to use a suspension with the highest solids content that can still be stirred well.

The acid activation is preferably done with a mineral acid such as sulfuric acid, hydrochloric acid, nitric acid or phosphoric acid. Sulfuric acid is preferred, as it does not evaporate during acid activation or even at the beginning of the subsequent calcination, so that if activation continues being completed even at the beginning of the calcination, and thus the activation can be done with a smaller quantity of acid. Furthermore, the calcium sulfate formed in the activation is relatively insoluble at room temperature or slightly elevated temperatures, but is able to migrate into the micropores at the calcination temperatures and to deposit there. Phosphoric acid has a similar action, as poorly soluble aluminum phosphate is formed. However it does not migrate into the pores as easily. This disadvantage can be eliminated by using a mixture of sulfuric acid and phosphoric acid.

Hydrochloric acid is less desirable, as it evaporates during activation and forms soluble salts which can be washed out of the micropores. Hydrochloric acid can be used, though, if the activation is done at elevated pressure in an autoclave. The disadvantages mentioned can also be eliminated by using a mixture of sulfuric acid and hydrochloric acid.

The calcined laminar silicate can also be washed, especially if the residual content of acids and soluble salts is greater than about 2% by weight and/or if the pore volume of the calcined layered silicate is less than about 0.2 ml/g. Acid will be in excess if the starting material contains very little alkali and alkaline earth metal and if a larger quantity of acid is used to increase the degree of activation. That is also the case if the pore volume of the calcined laminar silicate is less than 0.2 ml/g, especially less than 0.15 ml/g. In this case, not all the salts produced during the acid activation can migrate into the micropores and remain on the surface of the mesopores and macropores. That reduces the activity of the calcined laminar silicate. Essentially only the salts adsorbed at the surfaces of the mesopores and macropores are removed by washing, while most of the salts deposited in the micropores remain. This reduces the quantity of salt washed out in the wash water, which is desirable for environmental protection.

After washing, the calcined layered silicate is dried, and ground if desired.

It is preferable to suspend the calcined laminar silicate in water, acid, or an aluminum salt solution before washing. That simplifies the washing process, and in this case only part of the salt deposited in the micropores is washed out. Treatment with an aluminum salt solution, preferably an aluminum sulfate solution, has the further advantage that the OH groups on the surfaces of the mesopores and macropores react with $Al^{+3}$ ions, increasing the surface acidity of the material. That is desirable for many applications of the product according to the invention. For instance, molecules of colored materials are hydrolyzed at the acid surface of the material, improving the decolorizing action of the material according to the invention.

A further object of the invention is use of the layered silicates activated by the process of the invention for removal of impurities from fats, oils and waxes. Mineral, animal, or vegetable oils can be treated according to the invention. The products according to the invention are particularly suitable for decolorizing food fats and oils, such as olive oil, linseed oil, soy oil and rapeseed oil, as well as for waste petroleum oils. For example, the products according to the invention adsorb colored impurities such as chlorophyll or xanthophyll in the mesopores and macropores. Phospholipids in the fats and oils are also adsorbed, principally in the macropores.

EXAMPLES

The physical features used to characterize the products according to the invention are determined as follows:

1. Ion exchange capacity (IEC)

The layered silicate to be tested was dried at 150° C. for two hours. Then the dried material was allowed to react with a large excess of aqueous $NH_4Cl$ solution for 1 hour. After standing at room temperature for 16 hours, the material was filtered. The filter cake was washed, dried, and ground, and the $NH_4$ content in the layered silicate was determined by the Kjeldahl method.

2. pH of the starting material 10 g of a dried layered silicate was suspended in 100 ml distilled water with stirring for 30 minutes. After the layered silicate settled, the pH of the supernatant solution was determined with a pH electrode.

3. Pore volume

The pore volume was determined by the $CCl_4$ method (H. A. Benesi, R. V. Bonnar, C. F. Lee, Anal. Chem. 27 (1955), p. 1963.

Definite partial pressures of $CCl_4$ were produced by mixing $CCl_4$ with paraffin to determine the pore volumes at different pore diameter ranges.

4. Specific surface

This was measured by the BET method (single-point method using nitrogen, according to DIN 66131).

The invention was explained by means of the following examples:

Example 1

Acid treatment and calcining of halloysite

A natural halloysite of Mexican origin was activated with 3% by weight sulfuric acid. In this process, 700 g of the crude clay (water content 36%) was kneaded intensively in a Werner-Pfleiderer mixer with 300 ml $H_2O$ and 14.0 g 96% $H_2SO_4$ for 10 minutes at 30° C. Then the material was calcined for 60 minutes at 300° C.

The dry material from calcining was moistened with 55 ml water and ground in a Retsch hammer mill (0.12 mm mesh). The ground material was screened to give the following sieve fractions:

Residue on the 63 µm sieve: 25–35%

Residue on the 25 µm sieve: 50–60%

Example 1a

Acid treatment and calcining of halloysite at a variable calcination temperature A Mexican halloysite was activated with 3% $H_2SO_4$ as in Example 1. Calcination was done at temperatures of 100° C., 200° C., and 300° C., for 60 minutes in each case. Then the samples were moistened with distilled water to a water content of 8–10% by weight. Grinding and screening were done as in Example 1.

Table I shows the properties of the products from Examples 1 and 1a.

TABLE I

Characterization of the educts and products of halloysite activation
(Examples 1 and 1a)

|  | BET surface m²/g | IEC (mEq/100 g) | pH | Water content (% by weight) | Pore volumes ml/g 0–80 nm | 0–25 nm | 0–14 nm |
|---|---|---|---|---|---|---|---|
| Crude halloysite clay | 167 | 67.6 | 8.3 | 36 | 0.274 | 0.233 | 0.180 |
| Example 1 | 142 | 48.7 | 3.4 | 9.5 | 0.261 | 0.217 | 0.144 |
| Example 1a (100° C.) | 143 | 55.3 | 2.1 | 9.8 | 0.219 | 0.183 | 0.180 |
| Example 1a (200° C.) | 146 | 49.1 | 3.0 | 8.9 | 0.222 | 0.190 | 0.171 |
| Example 1a (300° C.) | 142 | 48.7 | 3.4 | 8.4 | 0.270 | 0.213 | 0.138 |

Example 2
Acid treatment and calcining of halloysite

The procedure used in Example 1 was repeated, except that 28.0 g of 96% $H_2SO_4$ was kneaded in, and the product was remoistened with 59 ml water. The grinding and screening were done as in Example 1. Table II shows the properties of the product.

Example 3
Acid treatment, calcining and washing of halloysite 100 g of the material obtained as in Example 2 (calcined and ground) was suspended for 10 minutes in 280 ml distilled water and then filtered by suction. The filter cake was washed three times with one liter of water each time. Then the material was dried at 100° C. to a residual moisture content of 8 to 10% by weight. The material was reground and screened as in Example 1.

Table II shows the properties of the product.

Example 4
Acid treatment, calcining and aluminum ion exchange of halloysite 100 g of the calcined and ground material from Example 1 was resuspended in 100 ml 4% $Al_2(SO_4)_3$ solution for 30 minutes, filtered, and washed three times with 1 liter of water each time. The material was dried at 100° C. to a residual moisture content of 8 to 10% by weight and ground and screened as in Example 1.

Table II shows the properties of the product.

Example 5
Acid treatment and calcining of bentonite 500 g South African bentonite with a water content of 38% by weight, a BET surface of 63.4 m²/g, an IEC of 80.0 meq/100 g, a pH of 7.9, and a total pore volume (0–80 nm) of 0.120 ml/g was kneaded in a Werner-Pfleiderer mixer with addition of 150 ml distilled water and 19.38 g 96% $H_2SO_4$ for 10 minutes at about 30° C. The material was calcined at 300° C. for 60 minutes. The calcined material was moistened with 35 ml distilled water and ground. The grinding and screening were done as in Example 1.

Example 6
Acid treatment and calcining of basic attapulgite 500 g of basic American (Georgia) attapulgite (water content 30% by weight, BET surface 132 m²/g, IEC 38.5 meq/100 g, pH 7.4, pore volume (0–80 nm)=0.350 ml/g; (0–25 nm)=0.224 ml/g; (0–14 nm)=0.178 ml/g) was kneaded in the Werner-Pfleiderer mixer with addition of 250 ml water and 10.94 g 96% $H_2SO_4$ for 10 minutes at 30° C., and then calcined for 60 minutes at 300° C. This material was moistened with 55 ml distilled water and then ground and screened as in Example 1.

Example 7
Acid treatment, calcining and aluminum ion exchange of basic attapulgite 250 g of the ground material from Example 6 was stirred for 30 minutes in 375 ml of a 4% $Al_2(SO_4)_3$ solution. Then the material so treated was filtered and washed three times, each with one liter of distilled water. The material was dried

TABLE II

Characterization of the educts and products of halloysite activation
(Examples 2 to 4)

|  | BET surface m²/g | IEC (mEq/100 g) | pH | Water content (% by weight) | Pore volume ml/g 0–80 nm | 0–25 nm | 0–14 nm |
|---|---|---|---|---|---|---|---|
| Crude halloysite clay | 167 | 67.6 | 8.3 | 36 | 0.274 | 0.233 | 0.180 |
| Example 2 | 125 | nd | 2.4 | 10.0 | nd | nd | nd |
| Example 3 | 185 | nd | 2.7 | 9.1 | nd | nd | nd |
| Example 4 | 142 | nd | 3.5 | 9.8 | nd | nd | nd | nd: not determined to a water content of 8–10% by weight, and ground and screened as in Example 1.

Application Examples

The sorbents according to Examples 1 to 7 are tested for their decolorizing action on various oils. The decolorizing action is determined using the "Lovibond Color Scan" method. Standard commercial acid-activated bleaching earths were used for comparison. These were the products Actisil® FF, Tonsil® ACC L80 FF, and Tonsil® Optimum FF (all commercial products of Süd-Chemie AG). The chlorophyll contents of the oils were also determined spectroscopically.

Application Example 1

Decolorizing soy oil with activated halloysite

Degummed soy oil having the following physical data was decolorized with the sorbents from Examples 1 to 4, and with Actisil® FF for comparison:

Lovibond color number, red: 10.0

Lovibond color number, yellow: 69.0

Chlorophyll A content: 0.54 ppm

This example makes clear the high activity of the materials activated by acid kneading and calcining, in comparison to conventional highly activated decolorizing earth (Actisil® FF).

The activity can be increased even more by washing (Example 3) or by aluminum ion exchange (Example 4).

Table III shows the results of the decolorization.

Application Example 2

Decolorizing sunflower oil with activated halloysite

Degummed sunflower oil with the following physical parameters was decolorized:

Lovibond color number, red: 2.9

Lovibond color number, yellow: 70

Chlorophyll A content: 0.14 ppm

The results of the decolorizing tests are shown in Table IV. This example shows the better decolorizing action of the product obtained according to the invention, compared with a known decolorizing earth.

TABLE IV

Decolorizing degummed sunflower oil with activated halloysite (Application example 2)

| Sorbent | Clay % by weight | Temperature (°C.) | Vacuum (mbar) | Time (min) | Lovibond color number 5 ¼" red | yellow | Chlorophyll A (ppm) |
|---|---|---|---|---|---|---|---|
| Example 1 | 0.15 | 95 | 16 | 20 | 1.0 | 16 | 0.04 |
| Actisil ® FF | 0.15 | 95 | 16 | 20 | 1.6 | 29 | 0.04 |

Application Example 3

Decolorizing palm oil with activated halloysite

Degummed palm oil with the following physical data was decolorized with the sorbents as in Examples 1 and 2:

Lovibond color number, red: 21.5

Lovibond color number, yellow: 69.1

Chlorophyll A content: 0.0 ppm

The results of the decolorizing tests are presented in Table V (compared with Actisil® FF). Both of the examples according to the invention have about the same activity as Actisil® FF for decolorizing palm oil.

TABLE III

Decolorizing degummed soy oil with activated halloysite (Application example 1)

| Sorbent | Clay % by weight | Temperature (°C.) | Vacuum (mbar) | Time (min) | Lovibond color number 5 ¼" red | yellow | Chlorophyll A (ppm) |
|---|---|---|---|---|---|---|---|
| Example 1 | 0.6 | 105 | 16 | 30 | 3.1 | 68.0 | 0.06 |
| Example 2 | 0.8 | 105 | 16 | 30 | 3.0 | 69.0 | 0.05 |
| Example 3 | 0.6 | 105 | 16 | 30 | 2.9 | 68.0 | 0.04 |
| Example 4 | 0.8 | 105 | 16 | 30 | 2.6 | 69.0 | 0.03 |
| Actisil ® FF | 0.6 | 105 | 16 | 30 | 3.5 | 68.0 | 0.02 |

TABLE V

Decolorizing degummed palm oil with activated halloysite
(Application example 3)

| Sorbent | Clay % by weight | Temperature (°C.) | Vacuum (mbar) | Time (min) | Lovibond color number 5 ¼" red | yellow |
|---|---|---|---|---|---|---|
| Example 1 | 1.0 | 120 | 40 | 30 | 14.3 | 69 |
| Example 2 | 1.0 | 120 | 40 | 30 | 13.0 | 69 |
| Actisil ® FF | 1.0 | 120 | 40 | 30 | 14.0 | 69 |

Application Example 4
Decolorizing rapeseed oil with activated halloysite

Degummed rapeseed oil with the following physical properties was decolorized with the sorbents as in Examples 1 and 2:

Lovibond color number, red: 5.1

Lovibond color number, yellow: 69

Chlorophyll A content: 3.94 ppm

The results of the decolorizing tests are shown in Table VI (compared with Actisil® FF). The examples made according to the invention have a somewhat better red Lovibond color number than Actisil® FF.

TABLE VI

Decolorizing degummed rapeseed oil with activated halloysite
(Application example 4)

| Sorbent | Clay % by weight | Temperature (°C.) | Vacuum (mbar) | Time (min) | Lovibond color number 5 ¼" red | yellow | Chlorophyll A (ppm) |
|---|---|---|---|---|---|---|---|
| Example 1 | 0.6 | 110 | 16 | 30 | 3.0 | 69 | 0.22 |
| Example 2 | 0.6 | 110 | 16 | 30 | 3.0 | 69 | 0.27 |
| Actisil ® FF | 0.6 | 110 | 16 | 30 | 3.3 | 69 | 0.19 |

[Translator's note: Rapeseed oil is also known as canola oil.]

Lovibond color number, red: 10.9

Lovibond color number, yellow: 69

Chlorophyll A content: 0.85 ppm

Table VII shows the results of the decolorizing tests. The example shows that acid-activated halloysite is sufficiently activated only above a calcining temperature of 200° C.

TABLE VII

Decolorizing degummed soy oil with halloysite activated at different temperatures (Application example 5)

| Sorbent | Clay % by weight | Temperature (°C.) | Vacuum (mbar) | Time (min) | Lovibond color number 5 ¼" red | yellow | Chlorophyll A (ppm) |
|---|---|---|---|---|---|---|---|
| Example 1a (100° C.) | 0.8 | 105 | 16 | 30 | 7.0 | 69 | 0.26 |
| Example 1a (200° C.) | 0.8 | 105 | 16 | 30 | 4.4 | 69 | 0.05 |
| Example 1a (300° C.) | 0.8 | 105 | 16 | 30 | 3.1 | 69 | 0.04 |

Application Example 5
Decolorizing soy oil with halloysite activated at different temperatures Degummed soy oil having the following physical characteristics was decolorized with the sorbents as in Example 1a:

Application Example 6
Decolorizing corn oil with activated bentonite

Degummed and neutralized corn oil with the following properties:

Lovibond color number, red: 5.9

Lovibond color number, yellow: 30.0
was used in the decolorizing tests done with the sorbent made as in Example 5.

Table VIII shows the results of the decolorizing tests, compared with Tonsil® ACC L 80 FF. The results show that even bentonite can be activated successfully by the process according to the invention.

TABLE VIII

Decolorizing degummed and neutralized corn oil with bentonite
(Application example 6)

| Sorbent | Clay % by weight | Temperature (°C.) | Vacuum (mbar) | Time (min) | Lovibond color number 5 ¼" red | yellow |
|---|---|---|---|---|---|---|
| Example 5 | 1.5 | 110 | 40 | 30 | 3.0 | 30.0 |
| Tonsil ® ACC L80 FF | 1.5 | 110 | 40 | 20 | 3.0 | 20.0 |

Application Example 7
Decolorizing soy oil with activated basic attapulgite

The decolorizing was done with the sorbent of Example 6, using degummed soy oil with the following physical properties:

Lovibond color number, red: 10.7
Lovibond color number, yellow: 70.0
Chlorophyll A content: 0.48

Table IX shows the results of the decolorizing tests. This example proves that it is possible to activate basic attapulgite by the process of the invention.

TABLE IX

Decolorizing degummed soy oil with activated attapulgite
(Application example 7)

| Sorbent | Clay % by weight | Temperature (°C.) | Vacuum (mbar) | Time (min) | Lovibond color number 5 ¼" red | yellow | Chlorophyll A (ppm) |
|---|---|---|---|---|---|---|---|
| Example 6 | 0.5 | 105 | 20 | 30 | 7.9 | 70.0 | 0.05 |
| Tonsil ® Optimum PP | 0.5 | 105 | 20 | 30 | 4.5 | 70.0 | 0.05 |

We claim:

1. A process for activating a starting product of layered silicates having an ion exchange capacity (IEC) of at least 24 meq/g to form an adsorbent bleaching earth product comprising activating the layered silicates with about 1 to 10% by weight acid based on the dry weight of the layered silicate at a temperature of not more than 80° C. and calcining the activated layered silicates at temperatures of about 200° to 400° C. to produce an activated, calcined layered silicate adsorbent bleaching earth product.

2. The process of claim 1, wherein the calcining is done over a period of from about 15 minutes to about 4 hours.

3. The process of claim 1 wherein the activated, calcined layered silicate adsorbent bleaching earth product is ground to produce a ground, activated calcined layered silicate adsorbent bleaching earth end product.

4. The process of claim 3 wherein the calcined product is moistened before being ground.

5. The process of claim 1 wherein the layered silicate starting product is selected from a group consisting of the serpentine group, the kaolin group, the talc-pyrophyllite group, the smectite group, the vermiculite or illite group, and the mica laminar silicates.

6. The process of claim 1 wherein the layered silicate has a pH of greater than about 7.

7. The process of claim 1 wherein the activating acid is added to a suspension of the layered silicate.

8. The process of claim 1 wherein the acid is a mineral acid.

9. The process of claim 8 wherein the mineral acid is sulfuric acid.

10. The process of claim 1 wherein the activated, calcined layered silicate is washed.

11. The process of claim 10, wherein the layered silicate is suspended in water, acid, or an aluminum salt solution before washing.

12. The process of claim 1 wherein the starting product of layered silicate has a pH of about 7.2 to about 9.0.

13. The process of claim 1 wherein the activating acid is kneaded into the layered silicate.

14. The process of claim 1 wherein the activated, calcined layered silicate is washed if the acids and salts contained within or on the calcined layered silicates comprise greater than about 2% by weight of the layered silicates.

15. The process of claim 1 wherein the activated, calcined layered silicate is washed if the pore volume of the layered silicate is less than about 0.2 mm/g.

* * * * *